US009417780B2

(12) United States Patent
Ishii et al.

(10) Patent No.: US 9,417,780 B2
(45) Date of Patent: Aug. 16, 2016

(54) INFORMATION PROCESSING APPARATUS (71) Applicant: Panasonic Corporation, Kadoma-shi, Osaka (JP)

(72) Inventors: Takumi Ishii, Osaka (JP); Yusaku Nakamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 104 days.

(21) Appl. No.: 14/197,984

(22) Filed: Mar. 5, 2014

(65) Prior Publication Data

US 2014/0380188 A1    Dec. 25, 2014

(30) Foreign Application Priority Data

Jun. 20, 2013  (JP) .................................. 2013-129711
Feb. 25, 2014  (JP) .................................. 2014-034333

(51) Int. Cl.
G06F 3/0486     (2013.01)
G06F 3/0484     (2013.01)

(52) U.S. Cl.
CPC ............ G06F 3/0486 (2013.01); G06F 3/0484 (2013.01); *G06F 2203/04806* (2013.01)

(58) Field of Classification Search
CPC ..................................................... G06F 3/048
See application file for complete search history.

(56) References Cited

U.S. PATENT DOCUMENTS

| 2002/0054113 | A1* | 5/2002 | Conrad | G06F 3/0486 715/764 |
| 2011/0197156 | A1* | 8/2011 | Strait | G06F 3/0481 715/771 |
| 2012/0311485 | A1 | 12/2012 | Caliendo, Jr. et al. | |

FOREIGN PATENT DOCUMENTS

JP        H06-274586        9/1994

OTHER PUBLICATIONS

Office Action issued in counterpart Japanese Patent Application No. 2014-034333 on May 10, 2016.

* cited by examiner

*Primary Examiner* — Amy Ng
*Assistant Examiner* — Michael J Cabrera
(74) *Attorney, Agent, or Firm* — Hamre, Schumann, Mueller & Larson, P.C.

(57) ABSTRACT

A processor of an information processing apparatus sets an enlargement target region in a system screen based on coordinates inputted in a coordinate input unit, superimposes and displays an enlarged image obtained by enlarging the enlargement target region, on the system screen, monitors whether or not the input in the coordinate input unit in the state where the enlarged image is displayed is performed through a drag operation of which starting coordinates are in the enlarged image. When the input in the coordinate input unit in the state where the enlarged image is displayed is performed through a drag operation of which starting coordinates are within the enlarged image, the processor monitors coordinates while the drag operation is performed. When the coordinates while the drag operation is performed come to be present within a predetermined range defined by the edge of the enlarged image, the processor erases the enlarged image.

6 Claims, 14 Drawing Sheets

INFORMATION PROCESSING APPARATUS

BACKGROUND

1. Technical Field

The present disclosure relates to an information processing apparatus that is capable of enlarging and displaying a partial region of a screen.

2. Related Art

In recent years, an increase in the resolution of display units has been advancing in information processing apparatuses such as notebook personal computers and desktop personal computers. However, as the increase in the resolution of display units advances, objects such as displayed characters and icons become smaller, and visibility with respect to the objects decreases. The technology described in JP 6-274586 A is a technology that is capable of addressing this problem. JP 6-274586 A discloses a technology that is capable of enlarging and displaying a partial region of a screen in an information processing apparatus.

SUMMARY

The present disclosure provides an information processing apparatus that is capable of improving operability in the case where a partial region of a screen is enlarged and displayed.

An information processing apparatus according to the present disclosure includes
  a display unit;
  a coordinate input unit operable to input coordinates on the display unit; and
  a processor operable to perform processing based on the input in the coordinate input unit,
    wherein the processor
    causes the display unit to display a system screen,
    sets an enlargement target region in the system screen based on the coordinates inputted in the coordinate input unit,
    superimposes and displays an enlarged image obtained by enlarging the enlargement target region by a predetermined magnification, on the system screen,
    monitors whether or not the input in the coordinate input unit in the state where the enlarged image is displayed is performed through a drag operation of which starting coordinates are in the enlarged image,
    when the input in the coordinate input unit in the state where the enlarged image is displayed is performed through a drag operation of which starting coordinates are within the enlarged image, monitors coordinates while the drag operation is performed,
    when the coordinates while the drag operation is performed come to be present within a predetermined range defined by the edge of the enlarged image, erases the enlarged image.

The information processing apparatus in the present disclosure is able to improve operability in the case where a partial region of a screen is enlarged and displayed.

BRIEF DESCRIPTION OF DRAWINGS

FIGS. 8A to 8C are views showing screenshots of the system screen on which an enlarged image is superimposed and.

DETAILED DESCRIPTION

Hereinafter, an embodiment is described in detail while referring to the drawings as appropriate. However, detailed descriptions are sometimes omitted when they are not required. For example, detailed descriptions of already well-known matters and repeated descriptions of substantially identical configurations are sometimes omitted. This has been done in order to avoid the following description from becoming unnecessarily redundant, and to facilitate understanding for persons skilled in the art.

It should be noted that the inventor(s) has provided the appended drawings and the following description in order for persons skilled in the art to sufficiently understand the present disclosure, not with the intention of thereby restricting the subject described in the claims.

(Backgrounds that Led to the Present Disclosure)

Conventionally, there are information processing apparatuses that are capable of enlarging and displaying a partial region of a screen (system screen) such as a desktop in which icons and a taskbar and the like are arranged. In these kinds of information processing apparatuses, for example, it is thought that an image (hereinafter, referred to as an "enlarged image" as appropriate) which is obtained by enlarging the partial region is overlaid and displayed on an enlargement source region (enlargement target region) in the system screen. However, in the case where this kind of display method is adopted, part of the system screen is hidden by the enlarged image. Therefore, there is a problem in that it is not possible for icons such as folders included in the enlarged image to be dragged to the hidden region in the system screen.

The present disclosure is made in order to cope with the aforementioned problem, and it is an object of the disclosure to provide an information processing apparatus that is capable of improving operability in the case where a partial region of a system screen is enlarged and displayed.

First Embodiment

Hereinafter, a first embodiment is described with reference to the drawings.

1-1. Configuration

Figure 1:
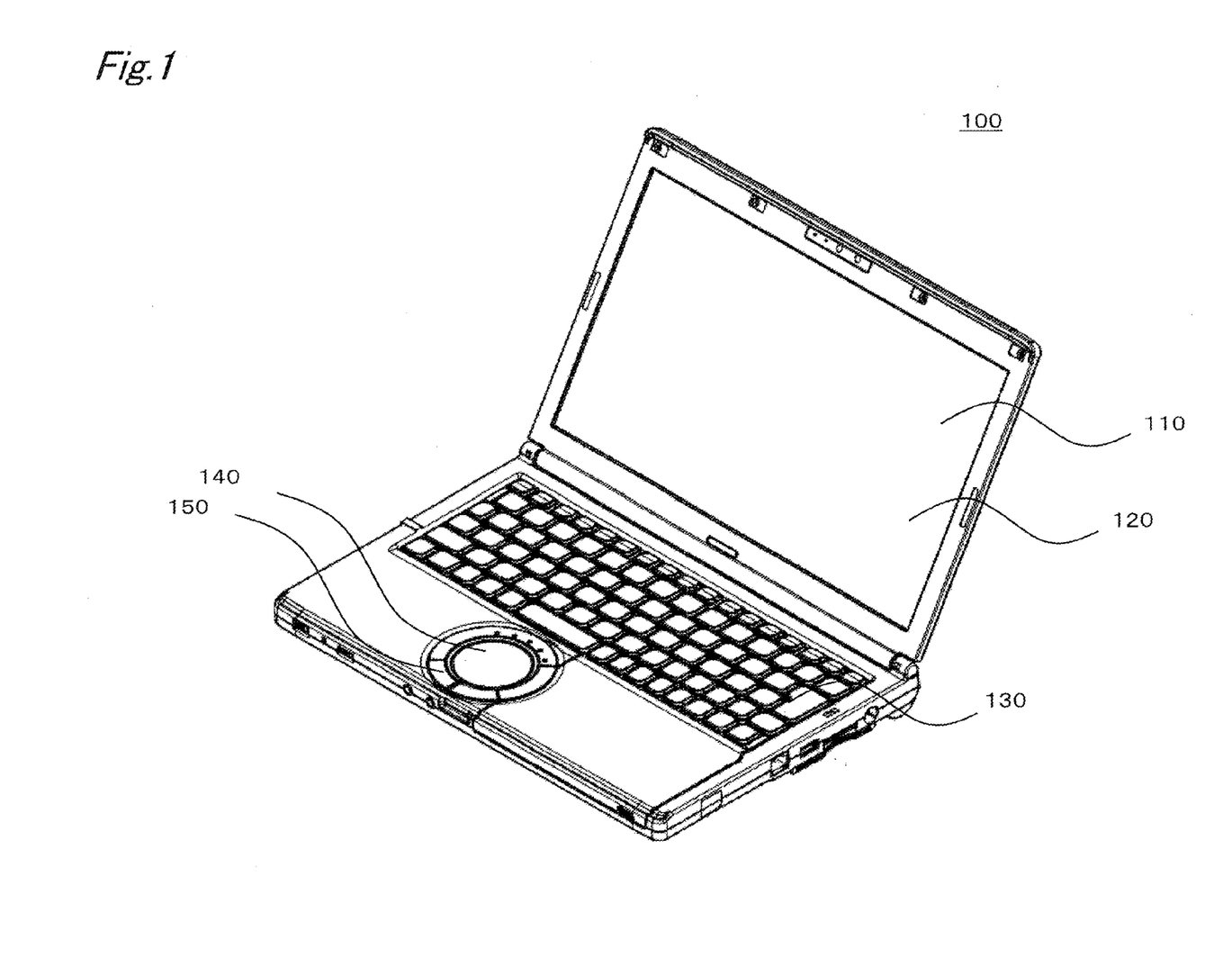
FIG. 1 is an external view of an information processing apparatus in a first embodiment.

FIG. 1 is a view showing the external appearance of an information processing apparatus in the first embodiment.

An information processing apparatus 100 performs predetermined information processing based on an installed OS (operating system). In the present embodiment, an example is described in which the information processing apparatus of the present disclosure has been applied to a notebook personal computer. It should be noted that the information processing apparatus of the present disclosure can also be applied to a laptop PC, a tablet PC, a smartphone, and the like.

The information processing apparatus 100 includes a display device 110, a touch panel 120, a keyboard 130, a touchpad 140, and buttons 150.

The display device 110 displays images and video. A liquid crystal display is used as the display device 110 in the present embodiment.

The touch panel 120 is a sensor that is integrally incorporated in the display device 110. A user of the information processing apparatus 100 is able to operate the information processing apparatus 100 by way of the touch panel 120 by touching the display surface of the display device 110. The touch panel 120 is able to execute processing such as moving a cursor displayed on the display device 110, and issuing instructions with respect to objects designated by the cursor. Movement of the cursor is performed by moving a finger across the touch panel 120. The issuing of instructions is performed by tapping the touch panel 120.

The keyboard 130 receives key input from the user.

The touchpad 140 receives input through touching operation from the user. The user is able to operate the information processing apparatus 100 by touching the touchpad 140. The touchpad 140 is able to execute processing such as moving a cursor displayed on the display device 110, and issuing instructions with respect to objects designated by the cursor. Movement of the cursor is performed by moving a finger across the touchpad 140. The issuing of instructions is performed by tapping the touchpad 140.

The buttons 150 are input devices with which a pressing operation is possible. The information processing apparatus 100 of the present embodiment includes a plurality of the buttons 150. The user is able to operate the information processing apparatus 100 by operating the buttons 150. Operations that can be executed by means of the buttons 150 include, for example, left-click and right-click operations, a double-click operation, and the like.

The touch panel 120, the keyboard 130, and the touchpad 140 are able to function as coordinate input units for inputting coordinates of the display screen of the display device 110. In the present embodiment, it will be described that the case where the touch panel 120 functions as a coordinate input unit. Moreover, in the present embodiment, moving a cursor continuously by moving a finger across the touch panel 120 or the touchpad 140 for example, or by operating a direction key of the keyboard 130, is referred to as a drag operation. Hereinafter, it is described that the case where a drag operation is performed on the touch panel 120. However, a drag operation may be performed using the touchpad 140 or the keyboard 130.

Figure 2:
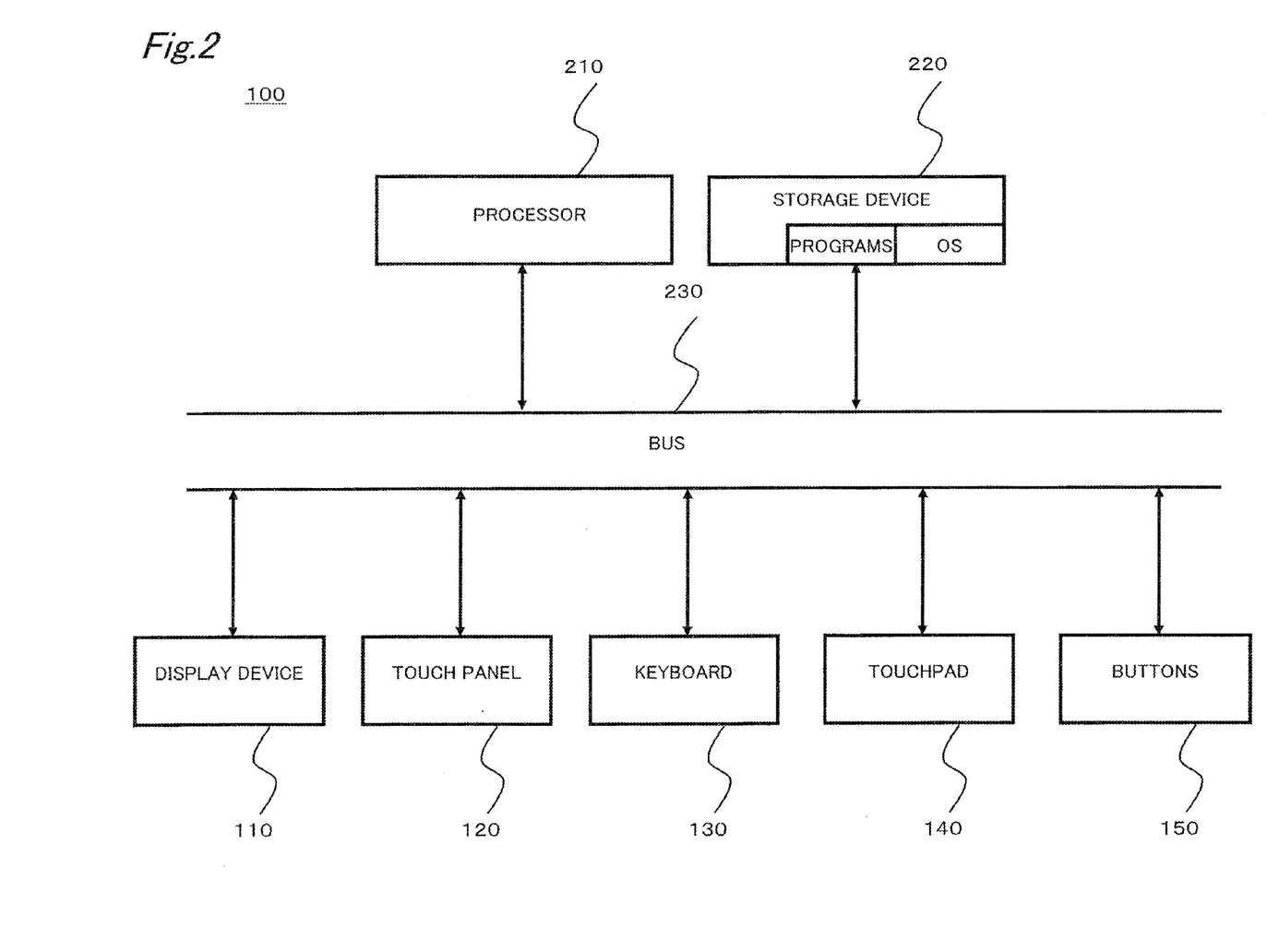
FIG. 2 is a block diagram showing the configuration of the information processing apparatus in the first embodiment.

FIG. 2 is a block diagram of the information processing apparatus 100 in the first embodiment.

The information processing apparatus 100 further includes a processor 210, a storage device 220, and a bus 230.

The processor 210 executes programs stored in the storage device 220. The processor 210 controls the constituent elements configuring the information processing apparatus 100 by executing the programs. For example, by executing a predetermined program, the processor 210 causes the display device 110 to display image information stored in the storage device 220.

The storage device 220 temporarily or permanently stores data required for the information processing apparatus 100 to perform information processing. The storage device 220, for example, stores programs and numerical values to which the programs refer. As the storage device 220, a non-volatile memory or a HDD (hard disk drive) for example is used. An OS is stored in the storage device 220. The OS provides to the user a system which allows the program (software) to handle the constituent elements provided in the information processing apparatus 100. Furthermore, a program (hereinafter, simply referred to as a "program" as appropriate) for enlarged image erasure processing described hereinafter is stored in the storage device 220.

The bus 230 is a communication path for control signals and data transmitted and received by the constituent elements configuring the information processing apparatus 100. Control signals and data are transmitted and received among the constituent elements of the information processing apparatus 100 via the bus 230. In the present embodiment, the display device 110, the touch panel 120, the touchpad 140, the buttons 150, the processor 210, and the storage device 220 are connected to the bus 230.

Via the bus 230, the processor 210 transmits and receives various signals with the constituent elements configuring the information processing apparatus 100, and thereby controlling the constituent elements. For example, the touch panel 120 sends coordinate information to the processor 210 via the bus 230. The coordinate information is information relating to the coordinates of a portion that the user has touched on the touch panel 120. The processor 210 executes a program using received coordinate information to generate various signals and image data. Generated signals are transmitted to the storage device 220 via the bus 230, and are stored as data in the storage device 220. Further, generated image is transmitted to the display device 110 via the bus 230. The display device 110 displays an image represented by the image. It should be noted that, although not shown, signals corresponding to information input by the user in the keyboard 130, the touchpad 140, or the buttons 150 are also transmitted to the processor 210 via the bus 230.

1-2. Operation

The operation of the information processing apparatus 100 configured as described above will now be described.

Figure 3:
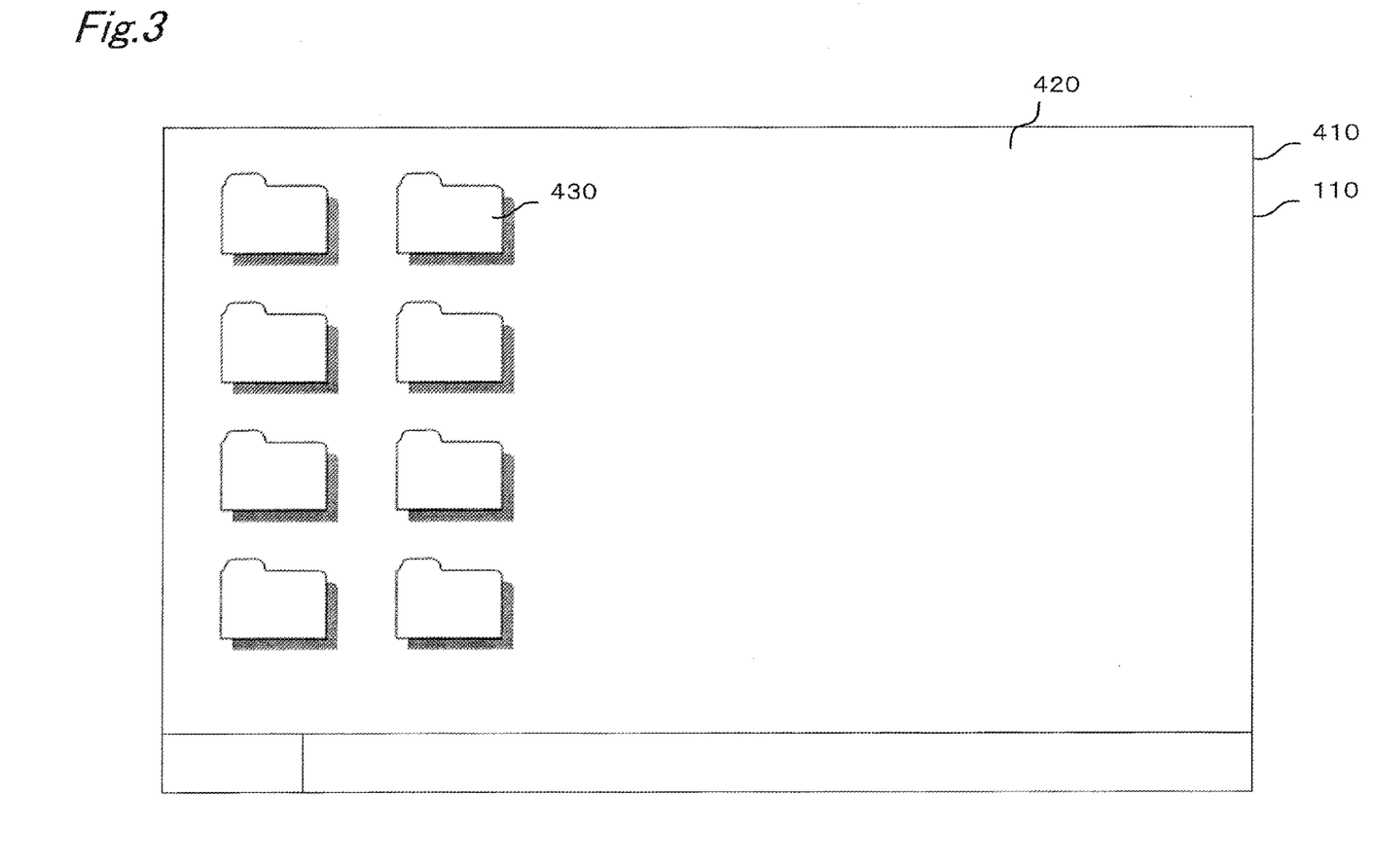
FIG. 3 is a view showing a screenshot of a system screen.

The processor 210 causes the display device 110 to display a system screen 410 such as that shown in FIG. 3 for example. FIG. 3 is a view that shows a screenshot of a system screen.

The system screen 410 is a screen that is generated and displayed by means of the functions of the OS and the like. Specifically, the system screen 410 is a screen in which a desktop 420, a plurality of icons 430, a taskbar, and operation images of application software and the like are superimposed and displayed. A web browser screen and a paint software screen and the like can be given as other examples of the system screen 410. In the present embodiment, it is assumed that the system screen 410 is displayed on the entirety of the display screen of the display device 110. Moreover, the system screen 410 may be displayed in only a part of the display screen of the display device 110.

1-2-1. Enlarged Image Display Processing and Enlarged Image Erasure Processing

The information processing apparatus 100 of the present embodiment is capable of performing enlarged image display processing and enlarged image erasure processing. The enlarged image display processing is processing which superimposes and displays on the system screen 410 an enlarged image that is obtained by enlarging a partial region of the system screen 410 in accordance with an operation to the touch panel 120 by the user. The enlarged image erasure processing is processing which erases an enlarged image that is enlarged and displayed through enlarged image display processing when predetermined conditions have been met. Hereinafter, the enlarged image display processing and the enlarged image erasure processing will be described.

1-2-1-1. Enlarged Image Display Processing

Figure 4:
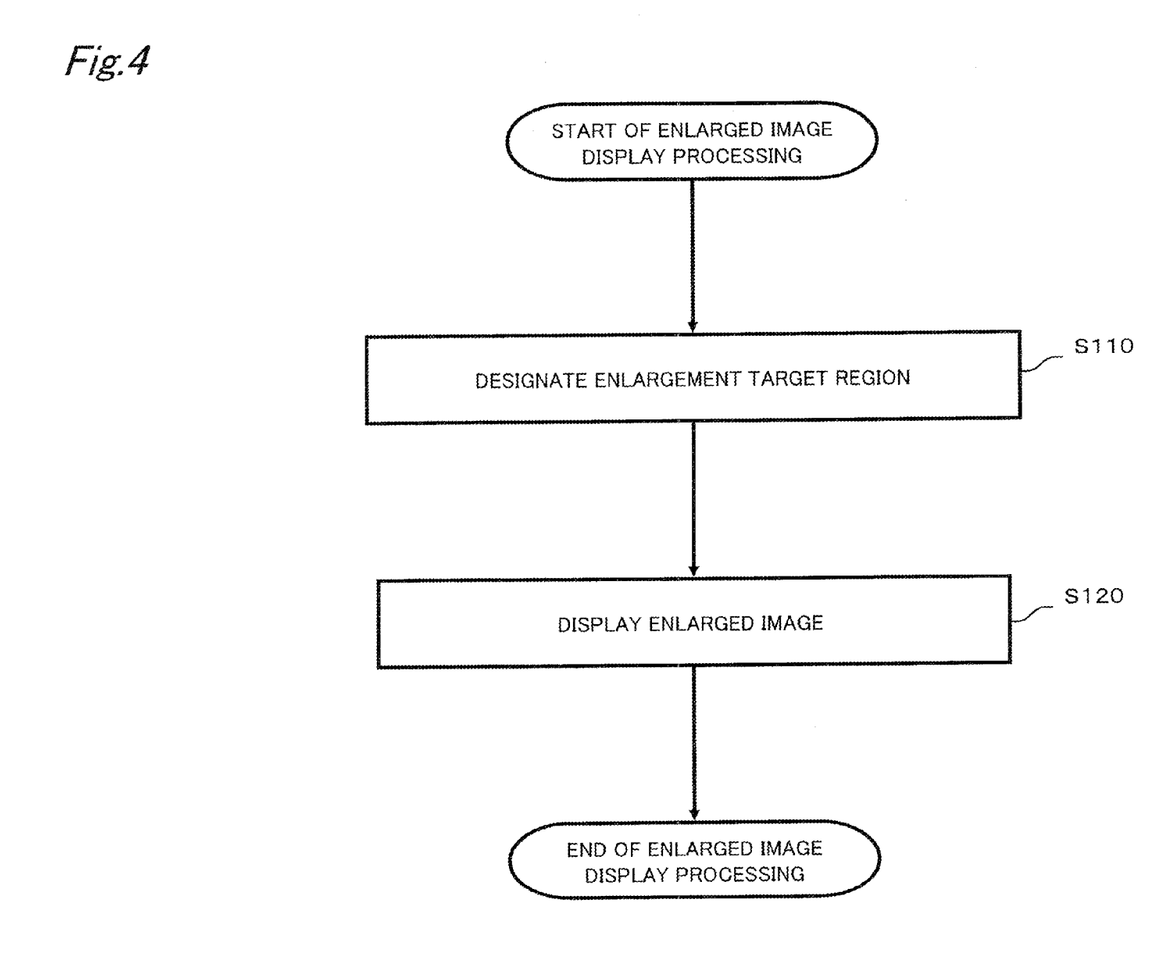
FIG. 4 is a flowchart describing enlarged image display processing.

The enlarged image display processing will now be described. FIG. 4 is a flowchart describing the enlarged image display processing.

The processing in the flowchart of FIG. 4 is realized as a result where the processor 210 executes a program stored in the storage device 220 while referring to various data. Hereinafter, it is described that, as an example, the case where a system screen 410 such as that shown in FIG. 3 is displayed on the display device 110 prior to the start of enlarged image display processing.

The enlarged image display processing may be started as a result where the user causes the information processing apparatus 100 to explicitly execute a predetermined program, or may be started by a background processing function of the OS.

First, the processor 210 receives the designation of an enlargement target region (S110). The enlargement target region is designated by the user. The enlargement target region is a partial region within the system screen 410.

Figure 5:
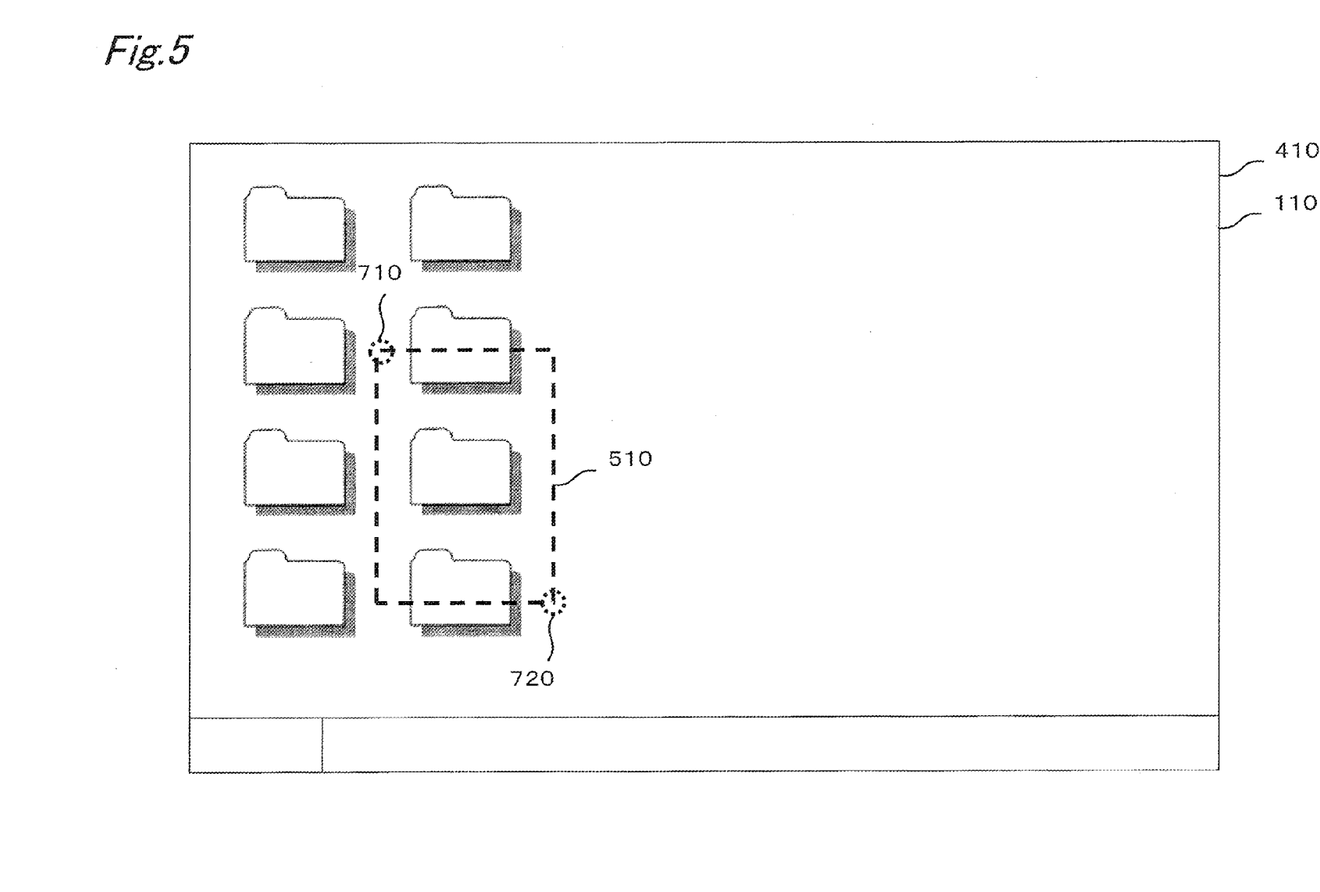
FIG. 5 is a view showing a screenshot of the system screen on which an enlargement target region is designated.

FIG. 5 is a view that shows a screenshot of the system screen on which an enlargement target region is designated.

In the present embodiment, it is assumed that an enlargement target region 510 is designated by the two points of a coordinate 710 and a coordinate 720 being designated through a touch operation or the like of the user with respect to the touch panel 120 for example. For example, the designation is performed by the two points 710 and 720 on the touch panel 120 being touched at the same time using the thumb and the middle finger. That is, a rectangular region in which the straight line joining the two points is a diagonal line is designated as an enlargement target region. Information regarding the coordinates is transferred from the OS to the program.

The processor 210 superimposes and displays, on the system screen 410, an enlarged image in which the enlargement target region 510 designated in step S110 has been enlarged (S120). Specifically, the processor 210 generates an enlarged image that is obtained by enlarging the enlargement target region 510 is by a predetermined magnification. The generated enlarged image is stored in the storage device 220.

Figure 6:
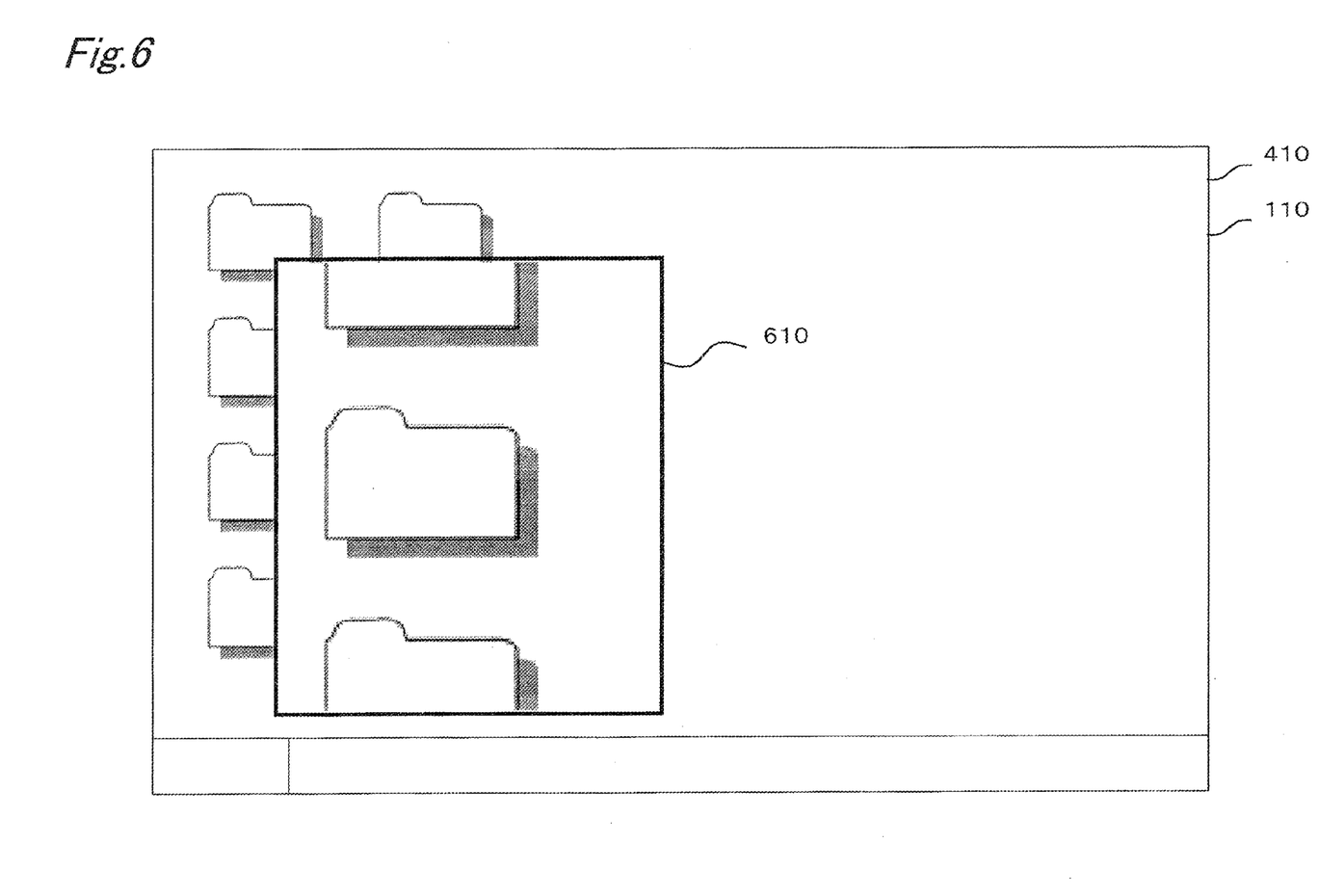
FIG. 6 is a view showing a screenshot of the system screen on which an enlarged image is superimposed and displayed.
Figure 7:
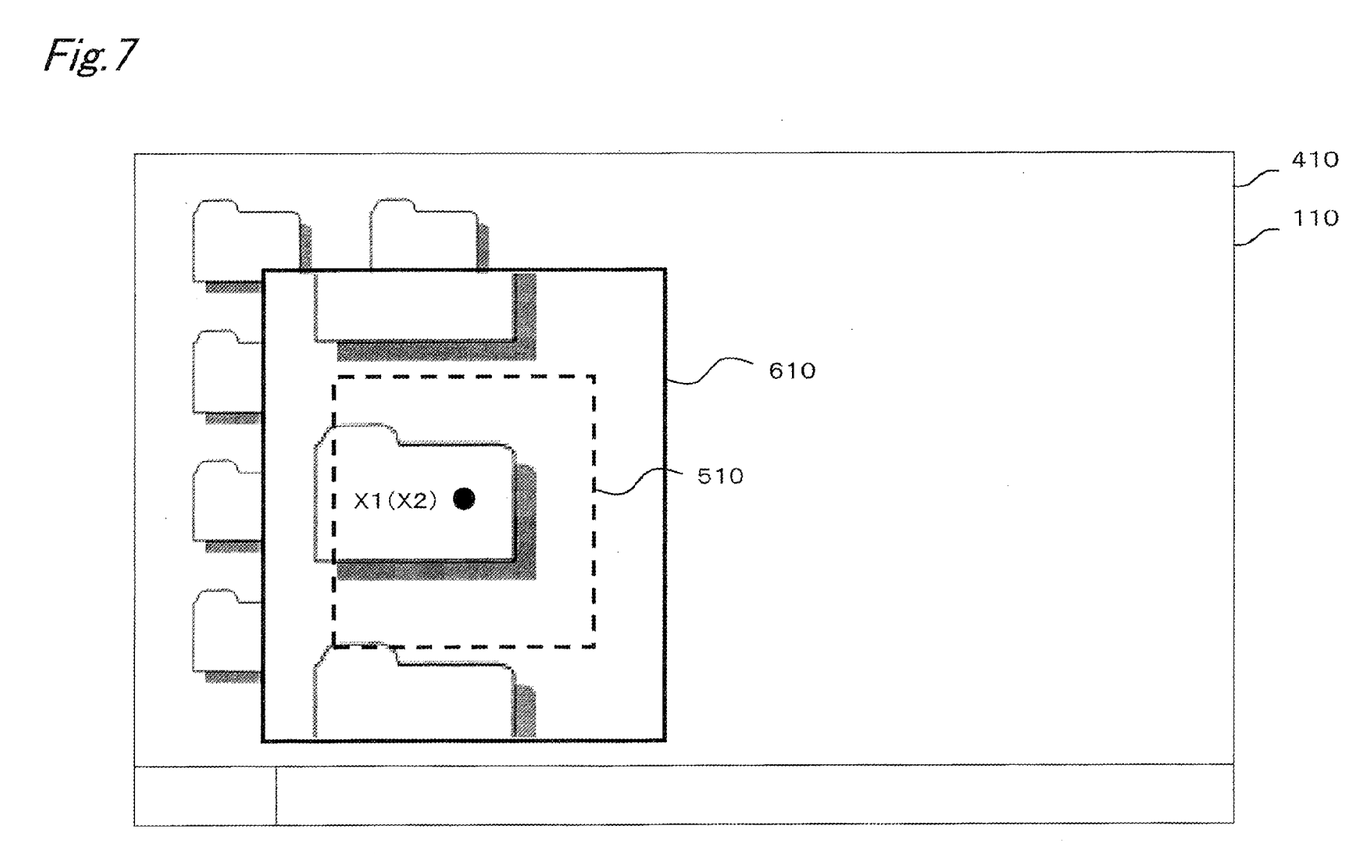
FIG. 7 is a view showing a screenshot of the system screen in on which an enlarged image is superimposed and displayed in a state where the enlarged image is overlaid on an enlargement target region.

FIG. 6 is a view that shows a screenshot of the system screen on which an enlarged image is superimposed and displayed. FIG. 7 is a view that shows a screenshot of the system screen on which an enlarged image is superimposed and displayed in a state where the enlarged image is overlaid on an enlargement target.

Figure 8A:
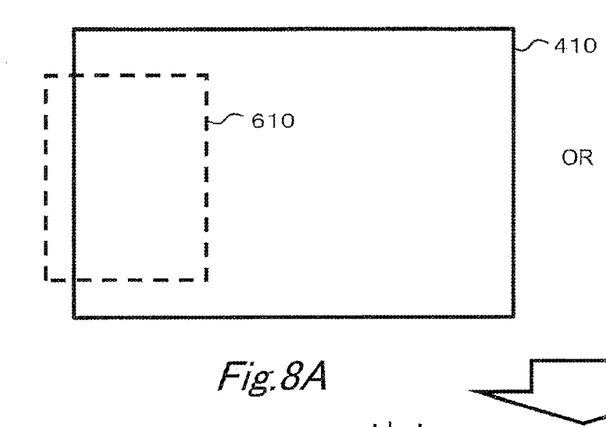
Figure 8B:
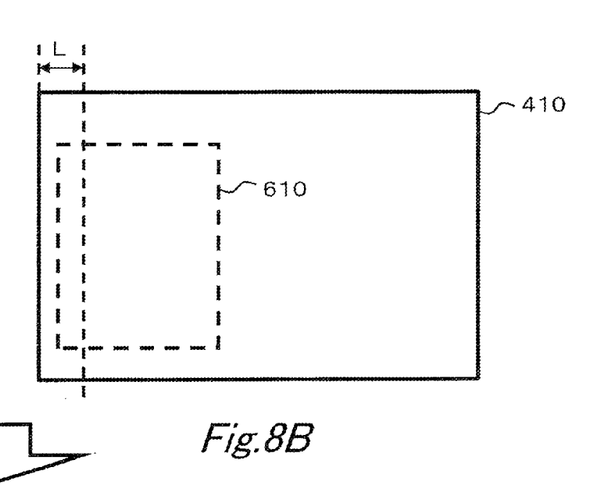
Figure 8C:
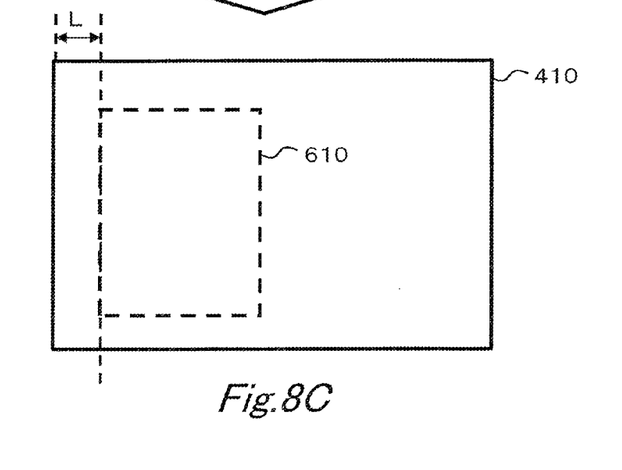

As shown in FIG. 7, the processor 210 superimposes and displays the generated enlarged image 610 on the system screen 410 so that the center X1 of the enlarged image 610 and the center X2 of the enlargement target region 510 coincide with each other. In the case where the centers X1 and X2 coincide with each other, due to the location of the enlargement target region 510, for example, as shown in FIG. 8A, the display range of the enlarged image 610 sometimes protrudes to the outside from the display range of the system screen 410, and as shown in FIG. 8B, the edge of the enlarged image 610 enters the range of a predetermined distance L from the edge of the system screen 410 toward the inside. In such cases, as shown in FIG. 8C, the processor 210 causes display device 110 to display the enlarged image 610 so that the edge of the enlarged image 610 is located in a location away from the edge of the system screen 410 toward the inside by the predetermined distance L. At such time, the center of the enlarged image 610 and the center of the enlargement target region do not coincide with each other.

In the case where an operation has been performed to an icon or the like in the enlarged image 610, the processor 210 performs processing corresponding thereto. Furthermore, in the case where an operation such as moving an icon has been performed within the enlarged image 610, this operation is reflected also to the enlargement source region (enlargement target region) in the system screen 410.

1-2-1-2. Enlarged Image Erasure Processing

Figure 9:
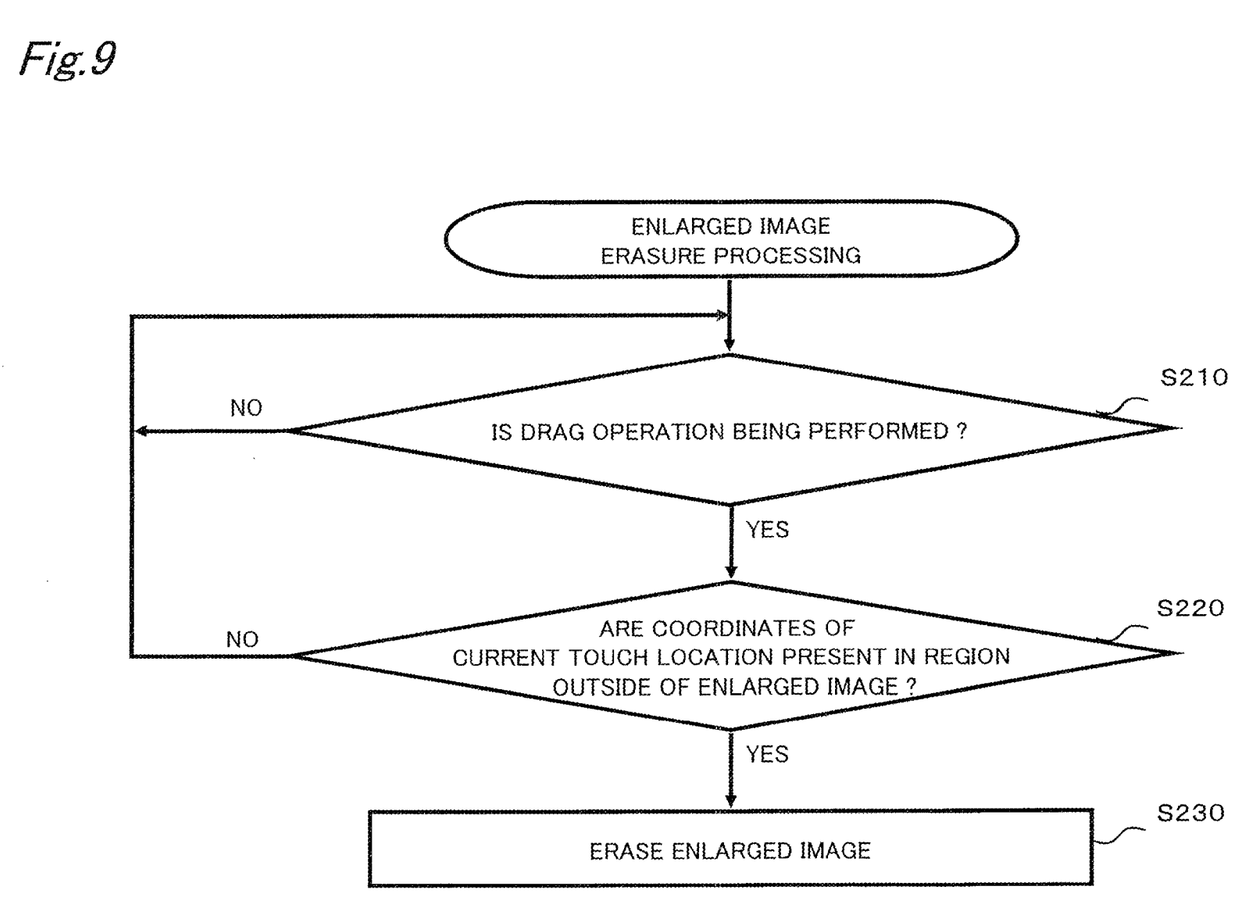
FIG. 9 is a flowchart describing enlarged image erasure processing.

The enlarged image erasure processing will now be described. FIG. 9 is a flowchart for describing the enlarged image erasure processing.

The processing in the flowchart of FIG. 9 is performed as a result where the processor 210 executes a program stored in the storage device 220 while referring to various data. Hereinafter, it will be described that, as an example, the case where an enlarged image 610 such as that shown in FIG. 6 is displayed on the display device 110, prior to the start of the enlarged image erasure processing.

First, the processor 210 monitors whether or not a drag operation of which starting coordinates are within the enlarged image 610 superimposed and displayed on the system screen 410 is being performed (S210). The determination whether or not a drag operation is being performed is made based on information regarding the presence/absence of a drag event that is returned from the OS in response to a query to the OS from the program in the present embodiment.

When the drag operation is not being performed ("no" in S210), the processor 210 repeatedly executes the processing of step S210.

On the contrary, when the drag operation is being performed ("yes" in S210), the processor 210 monitors whether or not the coordinates of the current touch location by the drag operation are coordinates that are present in the region outside of the enlarged image 610 (S220).

When the coordinates of the current touch location are coordinates in the region outside of the enlarged image 610 ("yes" in S220), the processor 210 erases the enlarged image 610 (S230).

On the contrary, when the coordinates of the current touch location are not coordinates in the region outside of the enlarged image 610 ("no" in S220), the processor 210 repeatedly executes the processing of step S210 and thereafter.

Figure 10A:
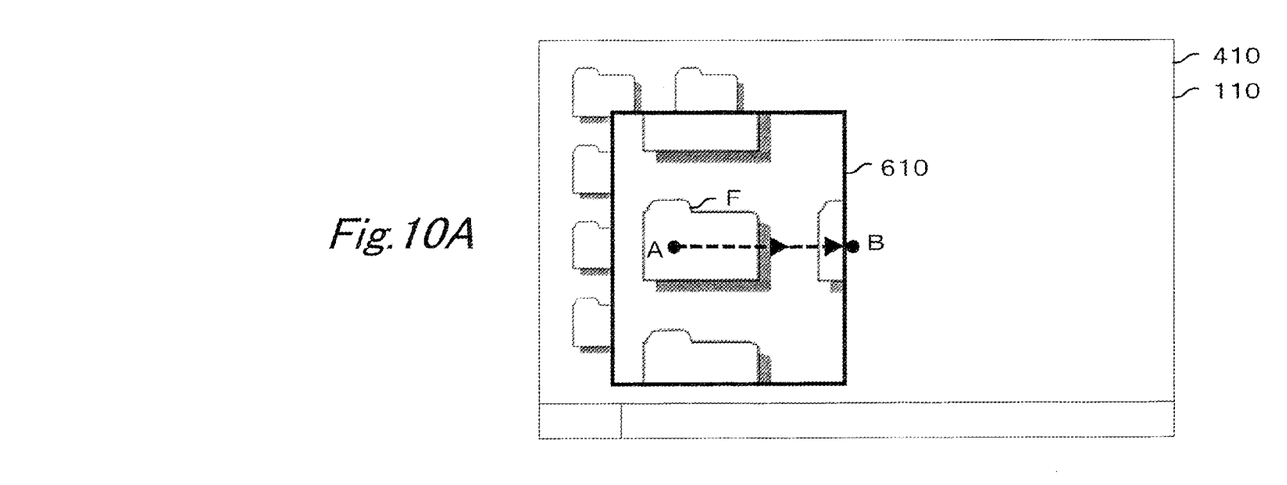
FIGS. 10A and 10B are views showing screenshots of the system screen showing an example of enlarged image erasure processing.
Figure 10B:
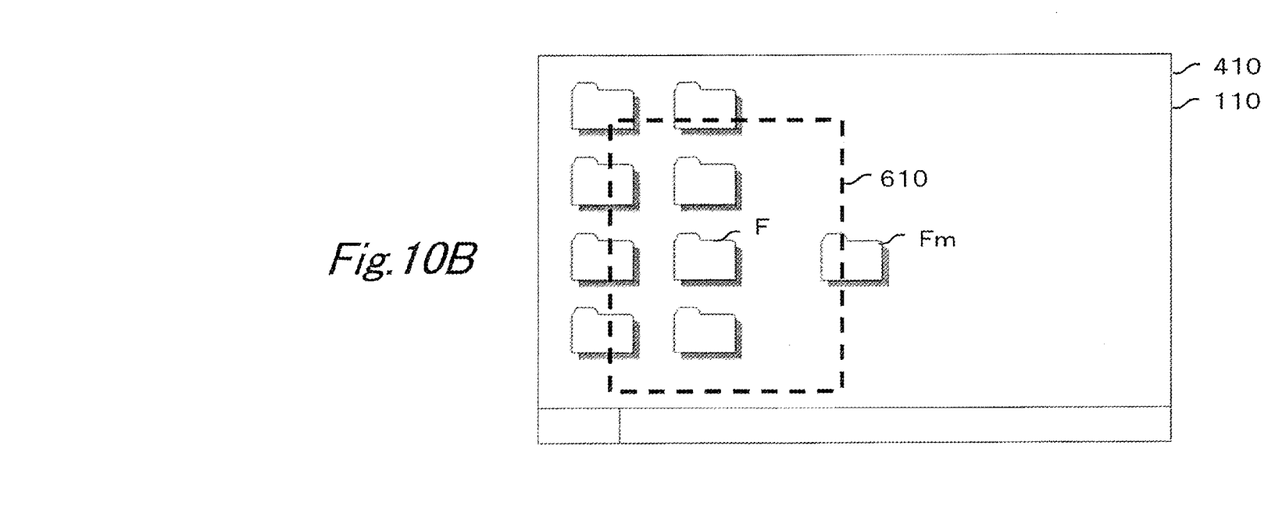

FIGS. 10A and 10B are views that show screenshots of the system screen showing the erasure processing for the enlarged image 610. As shown in FIG. 10A, the system screen 410 and the enlarged image 610 are displayed on the display device 110. In this state, when it is detected that the user has touches a portion of the screen at location A, and starts a drag operation for icon F from this location A, and the touch location in the drag operation has moved to the region outside of the enlarged image 610, for example location B, as shown in FIG. 10B, the processor 210 erases the enlarged image 610. Thus, the region hidden by the enlarged image 610 in the system screen 410 appears. FIG. 10B shows the state during the drag operation, and the icon F that is present in the enlargement target region and an icon Fm that is being dragged are displayed.

Figure 11:
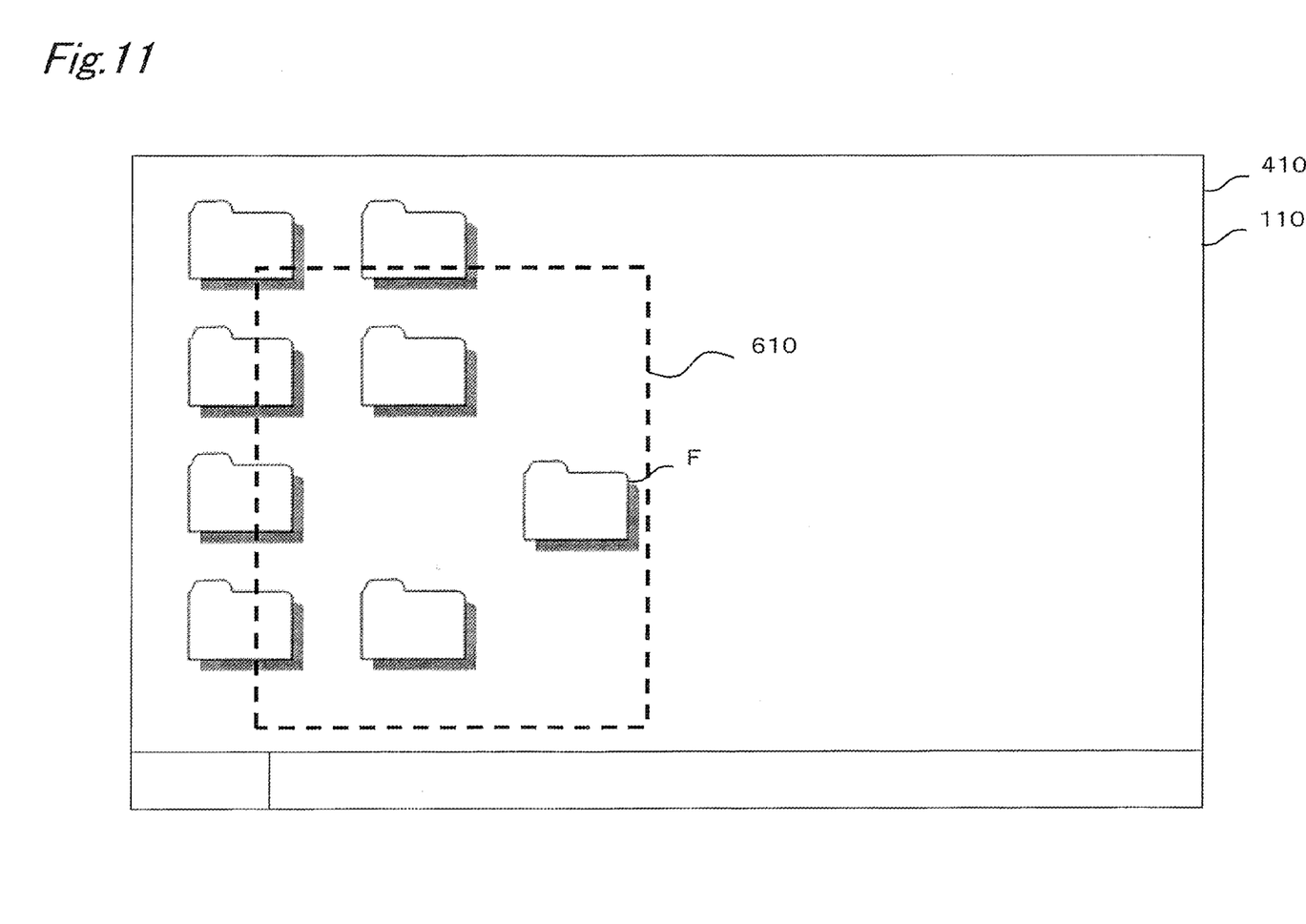
FIG. 11 is a view showing a screenshot of the system screen showing an example after enlarged image erasure processing.

In the case where the user, for example, wishes to drag the icon F or the like that is included in the enlarged image 610 to the region hidden by the enlarged image 610 in the system screen 410, this icon F should be temporarily moved by means of the drag operation to the region outside of the enlarged image 610. Thus, the enlarged image 610 is automatically erased, and the hidden region appears. Consequently, as shown in FIG. 11, it becomes possible for the user to move the icon F to the region hidden by the enlarged image 610, by a drag operation.

Figure 12:
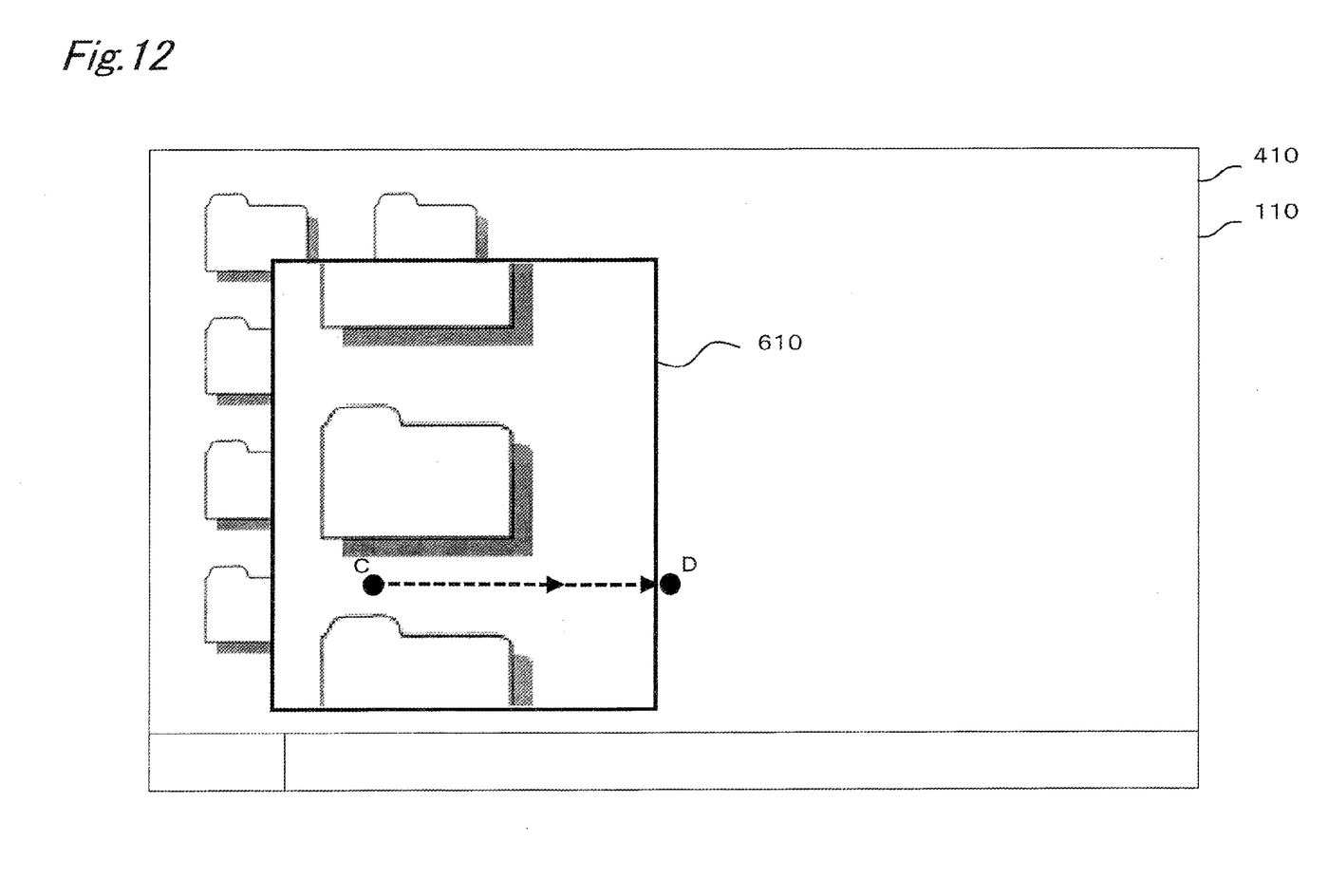
FIG. 12 is a view showing a screenshot of the system screen showing another example of enlarged image erasure processing.

FIG. 12 is a view that shows a screenshot of the system screen showing another example of enlarged image erasure processing. In the aforementioned FIG. 10, the case where a drag operation has been performed with respect to the icon F is described. However, as shown in FIG. 12, when a drag operation is performed with a location (coordinates C) at which the icon F is not present in the enlarged image 610 as a starting point, and the coordinates of the touch location come to be included in the region outside of the enlarged image 610 (coordinates D for example), the enlarged image 610 may be erased.

Figure 13:
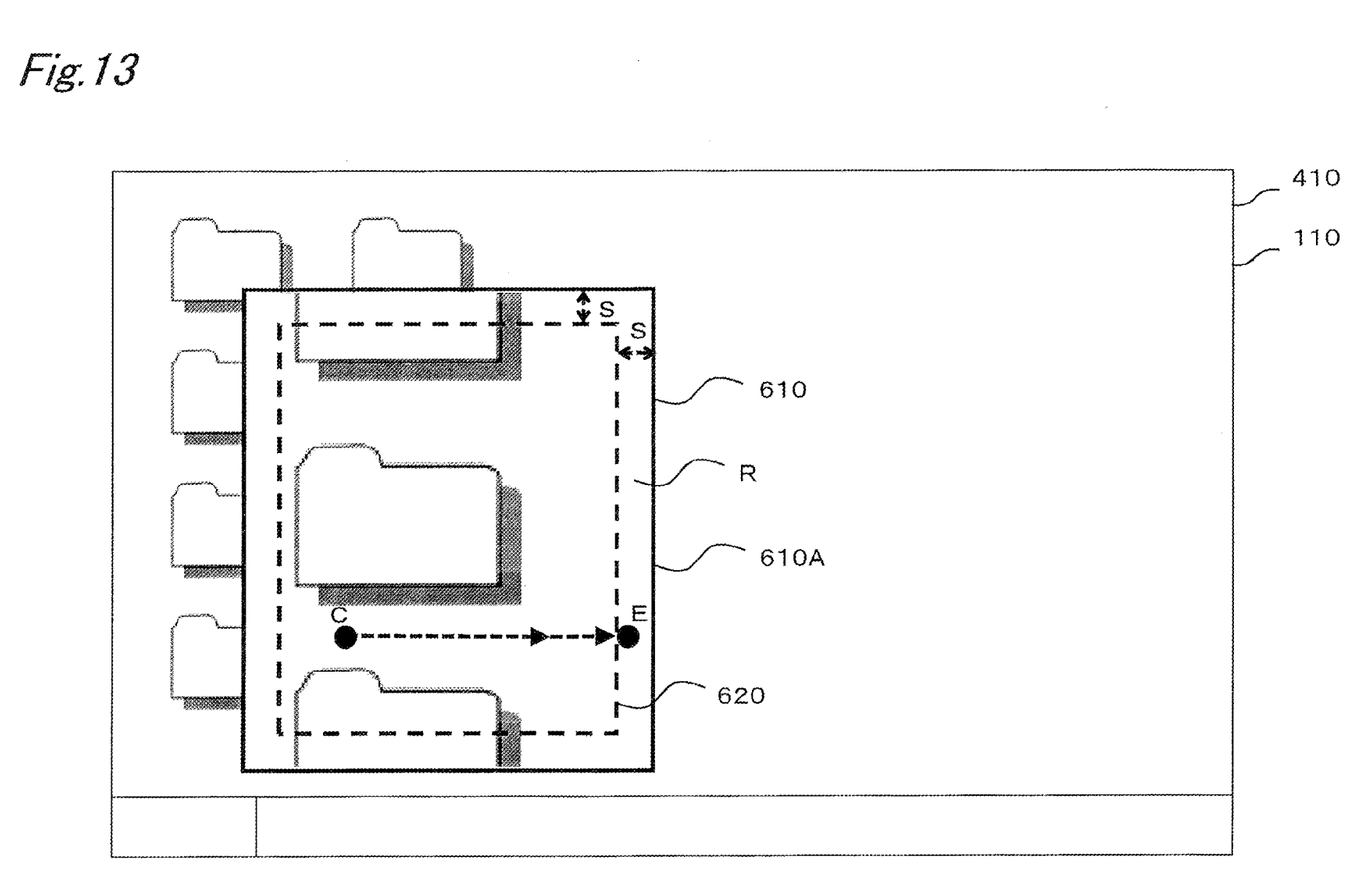
FIG. 13 is a view showing a screenshot of the system screen showing yet another example of enlarged image erasure processing.

FIG. 13 is a view that shows a screenshot of the system screen showing yet another example of enlarged image erasure processing. In the example of the aforementioned FIG. 10, when the coordinates of a touch location in a drag operation are coordinates that are included in the region outside of the enlarged image 610, the enlarged image 610 is erased. However, as shown in FIG. 13, when the coordinates of a touch location in a drag operation enter into a region R from the edge 610A of the enlarged image 610 to a border 620 that is set to the inside by a predetermined distance S (coordinates E for example), in other words, the enlarged image 610 may be erased when the coordinates of a touch location approaches to within the range of the predetermined distance S from the edge 610A.

Figure 14:
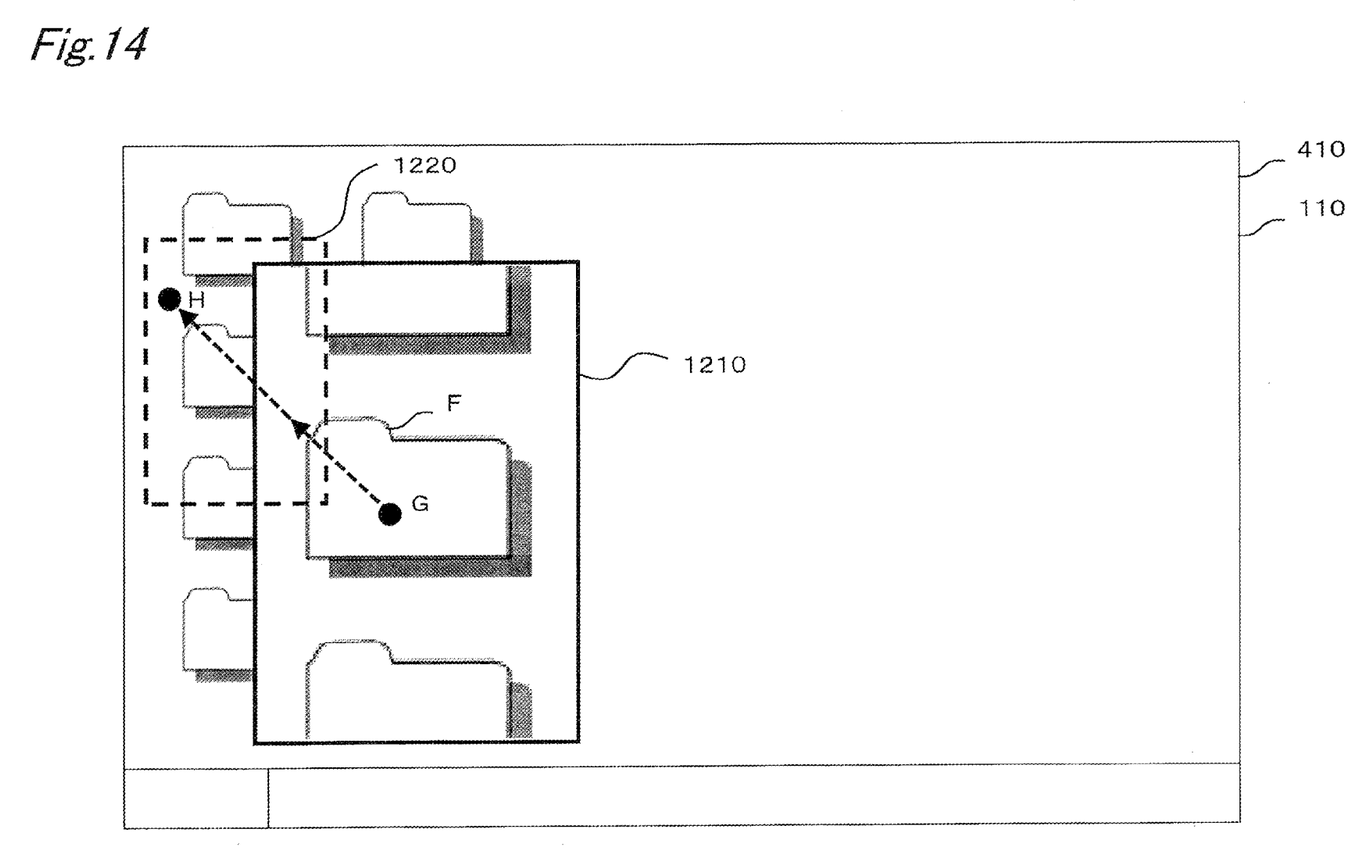
FIG. 14 is a view showing a screenshot of the system screen showing an example of exception handling in enlarged image erasure processing.

FIG. 14 is a view that shows a screenshot of the system screen showing yet another example of enlarged image erasure processing. Specifically, FIG. 14 shows an example of a case where an enlarged image 1210 is displayed without coinciding with the center of the enlarged image 1210 and the center of an enlargement target region 1220, as described in FIG. 8C. In FIG. 14, the enlargement target region 1220 is not completely hidden by the enlarged image 1210, and a part of the enlargement target region 1220 is displayed. In the aforementioned FIG. 10, when the coordinates of a touch location in a drag operation enter the region outside of the enlarged image, the enlarged image is erased. However, as shown in FIG. 14, in the case where a drag operation for the icon F of which starting coordinates are coordinates G that are included in the enlarged image 1210, the enlarged image 1210 may not be erased when the coordinates during the drag operation (coordinates H) are included within the enlargement target region 1220, even if the coordinates during the drag operation are included in the region outside of the enlarged image 1210. This is because, in the case where the region in which the coordinates in the drag operation (coordinates H) are present is a region that is not hidden by the enlarged image 1210 in the enlargement target region 1220, the drag operation is possible even if the enlarged image 1210 is not erased.

1-3. Effects and the Like

As described above, in the present embodiment, the information processing apparatus 100 includes the display device 110, the touch panel 120 that inputs coordinates on the display device 110, and the processor 210 that performs processing based on input in the touch panel 120. The processor 210 causes the display device 110 to display the system screen 410, sets an enlargement target region in the system screen 410 based on the coordinates inputted in the touch panel 120, superimposes and displays the enlarged image 610 obtained by enlarging the enlargement target region by a predetermined magnification, on the system screen 410. The processor 210 monitors whether or not the input in the touch panel 120 in the state where the enlarged image 610 is displayed is performed through a drag operation of which starting coordinates are in the enlarged image 610. When the input in the touch panel 120 in the state where the enlarged image 610 is displayed is performed through a drag operation of which starting coordinates are within the enlarged image 610, monitors coordinates while the drag operation is performed. On monitoring, when the coordinates while the drag operation is performed come to be present within a predetermined range defined by the edge of the enlarged image 410, the processor 210 erases the enlarged image 610.

The information processing apparatus 100 in the present disclosure is able to improve operability in the case where a partial region of the system screen 410 is enlarged and displayed.

For example, in the case where it is desired for an icon such as a folder included in the enlarged image 610 to be dragged to the region hidden by the enlarged image 610 in the system screen 410, the icon should be temporarily moved by means of the drag operation to the region outside of the enlarged image 610. Thus, the enlarged image 610 is automatically erased, and the hidden region appears. Consequently, it becomes possible for the icon to be dragged to this hidden region.

In the present embodiment, the predetermined region defined by the edge 610A of the enlarged image 610 is the region outside of the enlarged image 610. Thus, in the case where coordinates during the dragging come to be present in the region outside of the enlarged image 610, the enlarged image 610 is erased. Therefore, the timing of the erasure of the enlarged image 610 is easily understood by the user.

In the present embodiment, the processor 210 does not erase the enlarged image 1210 in the case where coordinates during a drag operation are present in the enlargement target region 1220 of the enlarged image 1210, even if the coordinates during the drag operation are performed are present in the region outside of the enlarged image 1210. This is because, in the case where the region in which the coordinates during the drag operation are present is a region that is not hidden by the enlarged image 1210 in the enlargement target region 1220, the drag operation is possible even if the enlarged image 1210 is not erased.

In the present embodiment, the drag operation is an operation in which an icon arranged on the system screen 410 is dragged. Therefore, operability in the case where an icon arranged on the system screen 410 is dragged from the enlarged image 610 onto the system screen 410 is improved.

(Other Embodiments)

As described above, the first embodiment has been described as an exemplification of the technology disclosed in the present application. However, the technology in the present disclosure can also be applied to an embodiment in which an alteration, substitution, addition, or omission or the like has been implemented as appropriate without restriction to the first embodiment. Furthermore, it is also possible to combine the constituent elements described in the aforementioned the first embodiment to constitute a new embodiment.

Accordingly, examples of other embodiments are given hereinafter.

In the first embodiment, the touch panel 120 is described as an example of a coordinate input device. However, the coordinate input unit is sufficient as long as it indicates specific coordinates on the display device 110. Consequently, the coordinate input unit is not restricted to the touch panel 120, and may be constituted by, for example, the touchpad 140 or a mouse (not shown) or the like. However, if the touch panel 120 is used as the coordinate input unit, the user is able to perform input while visually confirming the range to be enlarged.

In the first embodiment, the enlarged image is overlaid on the center of the enlargement target region and displayed. However, it is not essential for the enlarged image to be overlaid on the center of the enlargement target region and displayed, and the enlarged image may be displayed without being overlaid on the center.

In the first embodiment, it is described that an example in which one display device 110 is provided in the information processing apparatus 100. However, the information processing apparatus 100 may include two or more display devices 110. In this case, the system screen 410 may be displayed across a plurality of display devices 110.

In the first embodiment, an example is described in which the system screen 410 is displayed on the entire display screen (full screen) of the display device 110. However, the system screen 410 may be displayed in only a part of the display screen of the display device 110.

As described above, the first embodiment has been described as an exemplification of the technology in the present disclosure. The appended drawings and the detailed description have been provided for this purpose.

Consequently, in the constituent elements described in the appended drawings and the detailed description, there may be included not only constituent elements that are essential for solving the problem but also, in order to give an example of the aforementioned technology, constituent elements that are not essential for solving the problem. Therefore, the non-essential constituent elements should not be immediately perceived as being essential due to these non-essential constituent elements being described in the appended drawings and the detailed description.

Furthermore, since the purpose of the aforementioned embodiment is to give an example of the technology in the present disclosure, it is possible for various alterations, substitutions, additions, and omissions and the like to be implemented within the scope of the patent claims or within a scope equivalent thereto.

INDUSTRIAL APPLICABILITY

The present disclosure can be applied to an information processing apparatus that enlarges and displays an image. Specifically, the present disclosure can be applied to a personal computer, a smart phone, and a tablet terminal and the like.

What is claimed is:

1. An information processing apparatus, comprising:
    a display unit;
    a coordinate input unit operable to input coordinates on the display unit; and
    a processor operable to perform processing based on the input in the coordinate input unit,
    wherein the processor
        causes the display unit to display a system screen,
        sets an enlargement target region in the system screen, the enlargement target region based on the coordinates inputted in the coordinate input unit,
        superimposes and displays an enlarged image obtained by enlarging the enlargement target region by a predetermined magnification on the system screen,
        in a state where the enlarged image is displayed,
            monitors whether an input in the coordinate input unit is performed through a drag operation of which having starting coordinates in the enlarged image,
            when the input in the coordinate input unit is performed through a drag operation having starting coordinates within the enlarged image, monitors coordinates while the drag operation is performed, and
            when the coordinates while the drag operation is performed come to be present within a predetermined range that is a region outside of the enlarged image defined by the edge of the enlarged image, erases the enlarged image, unless the coordinates while the drag operation are performed are present in the enlargement target region of the enlarged image, in which case the image is not erased.

2. The information processing apparatus according to claim 1, wherein the drag operation is an operation in which an icon arranged on the system screen is dragged.

3. The information processing apparatus according to claim 1, wherein the enlarged image partially overlays the enlargement target region.

4. A method of displaying an enlarged image on a display unit of an information processing apparatus, the information processing apparatus including the display unit, a coordinate input unit operable to input coordinates on the display unit, and a processor operable to perform processing based on the input in the coordinate input unit, the method comprising:
    displaying, on the display unit, a system screen;
    setting an enlargement target region in the system screen, the enlargement target region being based on coordinates input from the coordinate input unit;
    superimposes and displays, on the system screen of the display unit, an enlarged image obtained by enlarging the enlargement target region by a predetermined magnification;
    when the enlarged image is displayed:
        monitors whether an input in the coordinate input unit is performed through a drag operation having starting coordinates within the enlarged image,
        monitors coordinates while a drag operation is performed when the input in the coordinate input unit is performed through a drag operation having starting coordinates within the enlarged image, and
        erases the enlarged image when the coordinates while the drag operation is performed come to be present within a predetermined range that is a region outside of the enlarged image defined by the edge of the enlarged image, unless the coordinates while the drag operation is performed are present in the enlargement target region of the enlarged image, in which case the image is not erased.

5. The method according to claim 4, wherein the drag operation is an operation in which an icon arranged on the system screen is dragged.

6. The method according to claim 4, wherein superimposing the enlarged image includes partially overlaying the enlarged image on the enlargement target region.

* * * * *